April 23, 1957  M. MALLORY  2,789,547
SUPERCHARGED GASOLINE ENGINE
Filed Dec. 16, 1955  2 Sheets-Sheet 1

INVENTOR.
MARION MALLORY
BY Edward M. Apple
ATTORNEY

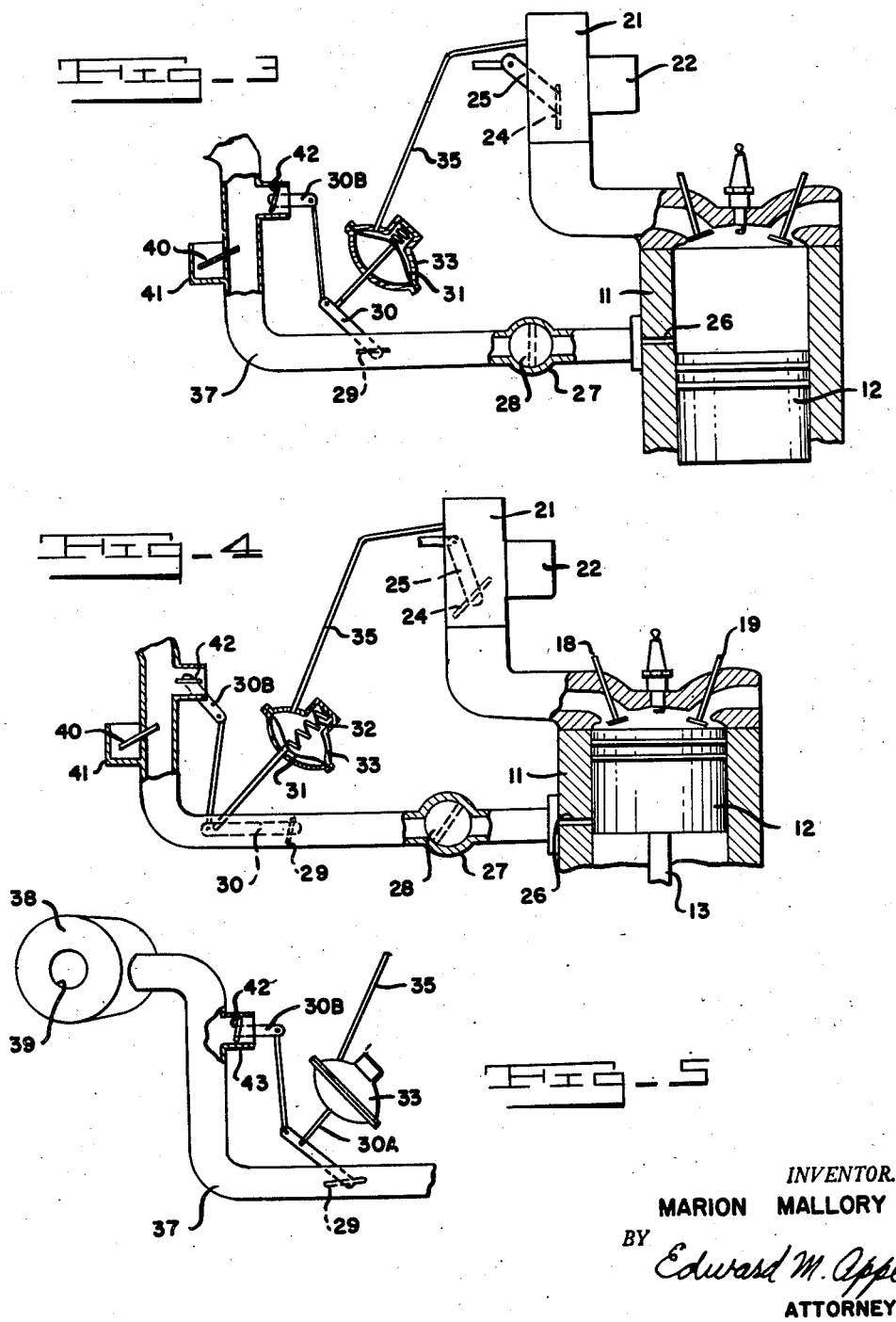

United States Patent Office 2,789,547
Patented Apr. 23, 1957

2,789,547

SUPERCHARGED GASOLINE ENGINE

Marion Mallory, Detroit, Mich.

Application December 16, 1955, Serial No. 553,633

4 Claims. (Cl. 123—75)

This invention relates to internal combustion engines of the four-cycle type, utilizing gasoline for fuel, and has particular reference to means for super-charging the engine, and means for stratifying the charge at high speed, whereby to increase the compression of the engine, and to effect increased economy of operation.

It is a well known fact that an engine operates more efficiently when under full compression. The increased compression ratios of the modern high speed gasoline engine has increased the horsepower rating of the engine, but the overall efficiency of the engine, and the miles per gallon economy, remain extremely low, particularly, when the engine is being operated at less than full throttle.

It is therefore an object of this invention to provide a gasoline engine, which at partly open throttle, and above, has the improved power and economy of an engine functioning under full compression and at high speed.

Another object of the invention is to provide a gasoline engine which is constructed and arranged, so that a mixture is drawn into the cylinder on the intake stroke, as in conventional practice, there being means also to introduce an additional, comparatively leaner fuel charge, or an additional charge of fresh air, into the combustion chamber at or near the start of the compression stroke of the piston, whereby there results a stratified condition in the cylinder, which stratified condition provides a full power, rich mixture at the top of the cylinder, in the vicinity of the spark plug, and a comparatively leaner mixture, immediately below the rich mixture strata, whereby the compression of the charge is greatly increased.

I am aware of the fact that others have attempted to supercharge and also stratify the fuel charge in an internal combustion engine, but in those previous attempts the secondary charge of fuel, or fresh air, has been admitted, either through the carburetor itself, or in such a manner as to greatly lean the entire mixture, with the result that the highest efficiency and maximum power could not be obtained.

It is therefore an object of this invention to obviate the foregoing difficulties and to provide an engine which has a high factor of power and economy.

The foregoing and other objects and advantages of the invention will become more apparent as the description proceeds, reference being made from time to time to the accompanying drawing, in which drawing:

Fig. 3 is a view similar to Fig. 1, but showing the relative position of the parts at the end of the power stroke.

Fig. 4 is a view similar to Fig. 1, but showing the relative position of the parts with nearly closed throttle, and at the end of the exhaust stroke of a cycle.

Fig. 5 is a fragmentary detail of a modified form of blower and associated parts, with the secondary carburetor removed.

Figure 1:
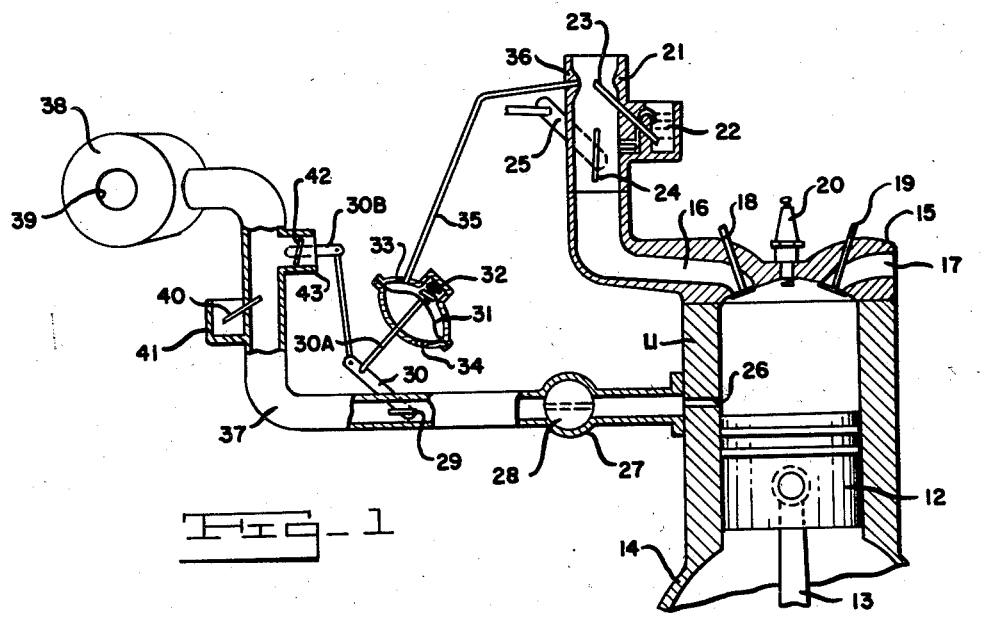
Fig. 1 is a vertical section, with parts broken away, taken through an engine embodying the invention and shows the relative position of the parts at the end of the intake stroke and start of the compression stroke, with throttle open.

Referring now more particularly to the drawings it will be understood that in the embodiment herein disclosed, the reference character 11 indicates the cylinder of an internal combustion engine having a piston 12 reciprocable therein, and having a connecting rod 13 and a crank case 14, as in conventional practice. The engine is also provided with a conventional cylinder head 15, having an intake passageway 16 and an exhaust passageway 17, in which passageways are respectively, an intake valve 18 and an exhust vlve 19, which are operated in conventional manner. The reference character 20 indicates a conventional spark plug for igniting the fuel charge. The reference character 21 indicates a carburetor, having a fuel reservoir 22, a fuel jet 23, a throttle 24 and linkage 25 for operating the throttle 24. These elements are also conventional in automotive practice. I will now describe the elements which are combined with the conventional elements heretofore referred to, to effect the new results which I claim for my invention.

Positioned in the side wall of the cylinder 11, as at 26, is a port. This port is positioned in the cylinder wall, so that it is uncovered by the piston 12 as it reaches the lower end of its travel in the cylinder. Secured to the cylinder wall 11 by any suitable means, so as to be in communication with the port 26, is a valve housing 27, which houses a rotary valve 28, which is driven by any suitable means by the engine, so that it rotates at ¼ engine speed. Also located in the housing 27, ahead of the rotary valve 28, is a valve 29, which is connected to linkage 20 and 30A, which in turn is connected to a diaphragm 31, which is spring backed, as at 32, the elements 31 and 32 being housed in a housing 33, which is open on one side to atmosphere, as at 34, and which is connected at the other side to a suction tube 35, which communicates with a port 36, located in the venturi tube of the carburetor 21. The housing 27 connects with a passageway 37, which in turn communicates with a power driven blower 38, which is operated at a variable speed by any suitable means off the engine. The blower 38 is opened to atmosphere as at 39. Interposed in the passageway 37 is a secondary fuel jet 30, which compresses part of a secondary carburetor 41. An air by-pass valve 42 is positioned in an extension 43 of the passageway 37, which extension is positioned between the blower 38 and the carburetor 41. The by-pass valve 42 is connected to linkage 30B which in turn is connected to the linkage 30, which is operated by the diaphragm 31 as previously described. The valve 42 is arranged to be closed when the valve 29 is open and is arranged to be opened to by-pass air from the blower 38, when the valve 29 is closed.

Although I prefer to use the secondary carburetor 40 and 41 in the passageway 37, in some applications I may dispense with the secondary carburetor 40 and 41, as shown in Fig. 5, in which modified form only fresh air, instead of a fuel charge would be forced through the passageway 37 and through the valves 29 and 28 into the cylinder. In other respects the device functions as hereinafter described. The device functions as follows:

With the throttle 24, open as shown in Fig. 1, when the piston approaches the end of its intake stroke the port 26 will be uncovered and the intake valve 18 and the exhaust valve 19 will be closed. At this instant there will be a high vacuum in the intake manifold at the port 36, which will cause the diaphragm 31 to be moved into the position shown in Fig. 1, actuating the linkage 31A, 30 and 30B to open the valve 29, and close the valve 42.

so that air from the blower 38 will be forced through the passageway 37 drawing with it fuel from the jet 40, or in the modified form Fig. 5, only fresh air, which is then admitted to the cylinder when the rotary valve 28 opens. The rotary valve 28 is timed to open permitting the secondary fuel charge (or fresh air as in Fig. 5) to be introduced to the cylinder through the port 26, at the end of the intake stroke or about the time the piston 12 starts its upward movement on the compression stroke.

It will be understood that previously, and on the intake stroke, the intake valve 18, was open and a mixture charge had been drawn into the upper part of the cylinder 11, and remained in and about the spark plug 20. Then upon the introduction of the secondary charge of fuel or air through the port 26, a stratification of the fuel charge in the cylinder takes place so that there is always a rich, full powered charge in the upper part of the cylinder for proper combustion, and a strata of leaner mixture in the lower part of the cylinder all of which is under full compression at the time combustion takes place. It will also be understood that at the time the rotary valve 28 opens, the intake valve 18 will be closed, so that none of the charge entering the port 26 can be blown back through the carburetor 21.

So long as the throttle 24 of the main carburetor 21 remains sufficiently open to run the engine at approximately 35 miles per hour, there is sufficient suction at the port 36, and in the line 35, to actuate the diaphragm 31, to hold the valve 29 open and the valve 42 closed, so that at or about the beginning of each compression stroke a secondary charge of a lean mixture, or fresh air, will have been admitted to the cylinder.

Figure 2:
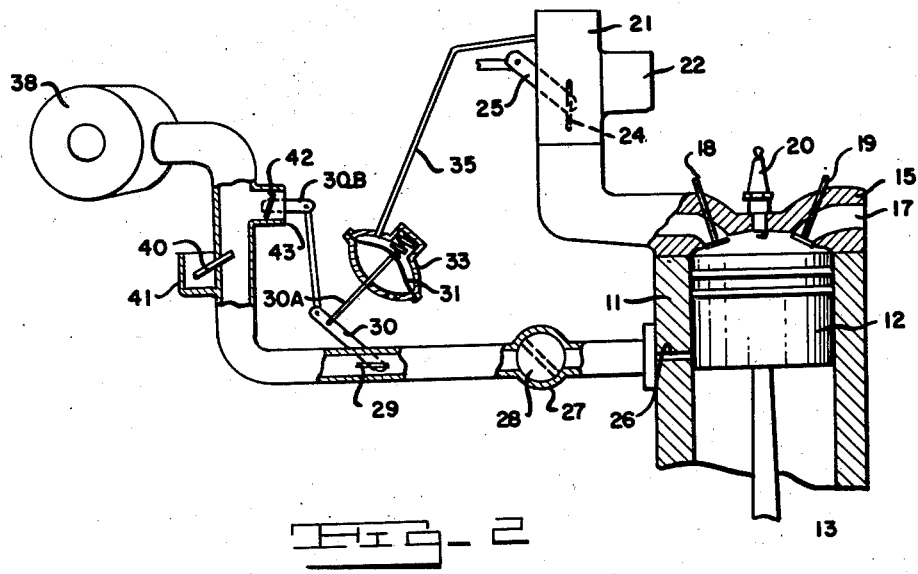
Fig. 2 is a view similar to Fig. 1, but showing the relative position of the parts at the end of the compression stroke.

It will be noted that in Fig. 2 the piston 12 is at the end of the compression stroke, at which time the intake valve 18, the exhaust valve 19, and the rotary valve 28 are all closed, and the port 26 is covered by the piston 12. At the same time the valve 29 is open and the by-pass valve is closed. The piston now, is ready to move downwardly.

In Fig. 3, I show the relative position of the parts at the end of the power stroke of the piston 12, at which time the intake valve 18 is closed, the exhaust valve 19 is open and the piston 12 has again uncovered the port 26, but in as much as the rotary valve 28 is still closed, the blower 38 has no effect on the charge even though the valve 29 remains open. The piston 12, is now ready to move upwardly on the exhaust stroke.

In Fig. 4, I show the relative position of the parts at the end of the exhaust stroke, and after the throttle 24 has been moved to nearly closed position. In this position of the throttle 24, the suction at the port 36, and in the line 35, is greatly reduced so that the diaphragm 31, under the influence of the spring 32, is moved downwardly, which in turn closes the valve 29 and opens the by-pass valve 42. So long as the vacuum at 36 is not sufficient to actuate the diaphragm 31, air from the blower 38 is by-passed through the extension 43 and has no effect in super-charging the engine, even though the port 26 may be uncovered by the piston 12 and the rotary valve 28 continues to open and close. The modified form Fig. 5 is the same as Fig. 1 except the secondary carburetor 40—41 has been eliminated. In this embodiment the blower 38 will super-charge the cylinder with fresh air only. It will be understood that when the secondary carburetor 40—41 is not used, and only fresh air is admitted through the port 26, it will operate the primary carburetor 21 with a full load, rich mixture and when both primary carburetor 21 and secondary carburetor 40—41 are used, it will not be necessary to use such a rich mixture in the primary carburetor 21.

In the operation of the engine the diaphragm 31 is preferably adjusted to open the valve 29, and close the valve 42, when the engine speed has reached approximately 35 miles per hour, so that at any speed above 35 miles per hour, the blower 38 will super-charge the engine and at speeds below the approximate speed of 35 miles per hour, the blower 38 will be rendered inoperative to super-charge the engine.

Having described my invention, what I claim and desire to secure by Letters Patent is:

1. In a gasoline engine of the character described, including a cylinder, a piston therein, a primary carburetor for charging said cylinder, and a manually operable throttle for controlling said primary carburetor, the combination of an air blower attached to and driven by said engine, a conduit connecting said blower with said cylinder at a point spaced from the top thereof, a secondary carburetor in communication with said conduit, between said blower and said cylinder, a rotary valve in said conduit driven in timed sequence by said engine, a second valve in said conduit between said rotary valve and said secondary carburetor, a suction device, linkage connecting said second valve to the diaphragm of said suction device, a suction tube connecting one side of said suction device to one side of said first named carburetor, whereby suction developed in said first named carburetor will actuate said suction device, which in turn will actuate said second valve.

2. The structure of claim 1, in which said last named linkage has means also for controlling the flow of air through said secondary carburetor.

3. The structure of claim 1, in which said linkage has a connection to a valve in said secondary carburetor, which may by-pass air from said blower around said secondary carburetor.

4. The structure of claim 1, in which said linkage has a section connected to a third valve, which controls an opening in said conduit between said blower and said second named valve.

References Cited in the file of this patent

UNITED STATES PATENTS

| | | |
|---|---|---|
| 1,802,577 | Ross | Apr. 28, 1931 |
| 1,907,470 | Abell | May 9, 1933 |
| 2,240,088 | Birkigt | Apr. 29, 1941 |
| 2,355,716 | Ericson et al. | Aug. 15, 1944 |